United States Patent
Oohashi (10) Patent No.: US 8,022,585 B2
(45) Date of Patent: Sep. 20, 2011

(54) IN-VEHICLE AC GENERATOR HAVING AN ENCLOSED REGULATOR HOLDING UNIT

(75) Inventor: Atsushi Oohashi, Chiyoda-ku (JP)

(73) Assignee: Mitsubishi Corporation, Tokyo (JP)

( * ) Notice: Subject to any disclaimer, the term of this patent is extended or adjusted under 35 U.S.C. 154(b) by 57 days.

(21) Appl. No.: 12/517,217

(22) PCT Filed: Mar. 28, 2007

(86) PCT No.: PCT/JP2007/056584

§ 371 (c)(1),
(2), (4) Date: Jun. 2, 2009

(87) PCT Pub. No.: WO2008/120300

PCT Pub. Date: Oct. 9, 2008

(65) Prior Publication Data

US 2010/0052481 A1     Mar. 4, 2010

(51) Int. Cl.
H02K 11/00 (2006.01)
H02K 9/00 (2006.01)
(52) U.S. Cl. .......... 310/68 D; 310/58; 310/64; 310/68 R
(58) Field of Classification Search .............. 310/58, 310/68 D, 68 R, 71, 64
See application file for complete search history.

(56) References Cited

U.S. PATENT DOCUMENTS 5,686,780 A * 11/1997 Adachi et al. ............... 310/68 D

FOREIGN PATENT DOCUMENTS

| EP | 17833881 A1 * | 9/2006 |
| JP | 57-116569 A | 7/1982 |
| JP | 01-286755 A | 11/1989 |
| JP | 06-284659 A | 10/1994 |
| JP | 2000-166178 A | 6/2000 |
| JP | 2001-016829 A | 1/2001 |
| JP | 2002-142423 A | 5/2002 |
| JP | 2003-031977 A | 1/2003 |
| JP | 2006-066633 A | 3/2006 |
| JP | 2006066633 A * | 3/2006 |
| WO | WO 2006022005 A1 * | 3/2006 |
| WO | WO 2006048930 A1 * | 5/2006 |

OTHER PUBLICATIONS

English Tanslation WO2006022005 on published as EP1783881 (2006).*

* cited by examiner

Primary Examiner — Quyen Leung
Assistant Examiner — Jose Gonzalez Quinones
(74) Attorney, Agent, or Firm — Sughrue Mion, PLLC (57) ABSTRACT

There is provided an in-vehicle AC generator having a regulator assembly that is mounted in the bracket of the AC generator. The regulator holding unit provided in the regulator assembly has a containing portion in which at least the whole periphery of an opening is surrounded by a wall member; a circuit unit of the regulator is inserted into the containing portion through the opening; the heat sink for the regulator is held by the containing portion in such a way that the peripheral portion thereof is adhered to the wall member that surrounds the whole periphery of the opening, and closes the opening; and the containing portion is provided with a resin filled in the vicinity of the contained circuit unit.

10 Claims, 6 Drawing Sheets

IN-VEHICLE AC GENERATOR HAVING AN ENCLOSED REGULATOR HOLDING UNIT

TECHNICAL FIELD

The present invention relates to an in-vehicle AC generator mounted in a vehicle such as an automobile.

BACKGROUND ART

An in-vehicle AC generator mounted in a vehicle such as an automobile and driven by an internal-combustion engine is provided with a rectifier that converts an AC voltage induced across the stator winding thereof into a DC voltage, and a regulator that adjusts a voltage induced across the stator winding thereof. In general, the regulator is provided with a circuit unit having a circuit that adjusts a voltage induced across the stator winding, and a heat sink that makes contact with the surface of the circuit unit and radiates heat generated in the circuit unit; the regulator is mounted in a regulator holding unit. The regulator holding unit, a brush holding unit that holds a brush, and an external terminal holding unit that holds an external terminal for connecting the regulator with an external apparatus are integrally assembled in a regulator assembly. The regulator assembly is mounted at an axis-direction end of the AC generator.

In a conventional in-vehicle AC generator, a regulator holding unit provided in a regulator assembly includes a containing portion for containing a circuit unit of a regulator; three sides of the containing portion are surrounded by a wall member and the rest is opened. The circuit unit of the regulator is contained in the containing portion of the regulator holding unit; three peripheral sides of a heat sink adhered to the circuit unit are adhered to a wall member that surrounds the containing portion. In the containing portion of the regulator holding unit, the contained circuit unit is protected and held by a curable resin that is filled into the containing portion through the opened side (for example, refer to Patent Documents 1 and 2).

[Patent Document 1] Japanese Patent Application Laid-Open No. 2001-16829
[Patent Document 2] Japanese Patent Application Laid-Open No. 2002-142423

DISCLOSURE OF THE INVENTION

Problems to be Solved by the Invention

In a conventional in-vehicle AC generator, there have been problems described below. Because, in the regulator holding unit, only three sides among four peripheral sides of the heat sink of the regulator are adhered to the wall member, the holding strength of the heat sink is not sufficient; moreover, because one peripheral side of the containing portion that contains the circuit unit of the regulator is opened even after the regulator is mounted, the resin filled in the containing portion is exposed to the outside, whereby change with time is liable to cause the resin to be deteriorated, and the holding strength for the circuit unit lowers.

The present invention has been implemented in order to solve the foregoing problems in a conventional in-vehicle AC generator; the objective thereof is to obtain an in-vehicle AC generator provided with a regulator holding unit capable of robustly holding a regulator and reducing deterioration in a resin filled in a containing portion that contains a circuit unit of the regulator.

Means for Solving the Problems

An in-vehicle AC generator according to the present invention is provided with a stator fixed to a bracket; a stator winding provided on the stator; a rotor shaft pivotably supported by the bracket; a rotor that is fixed on the rotor shaft and disposed in a space situated more proximal from the rotor shaft than the stator; a magnetic-field winding provided on the rotor; a slip ring that is fixed on the rotor shaft and electrically connected with the magnetic-field winding; a brush that makes contact with the slip ring and supplies a magnetic-field current to the magnetic-field winding; a regulator having a circuit unit provided with a circuit for adjusting the value of a voltage generated across the stator winding and a heat sink that is adhered to a surface of the circuit unit and radiates heat generated in the circuit unit; and a regulator assembly having a brush holding unit that slidably holds the brush, a regulator holding unit that holds the regulator, and a connecter holding unit that holds a connecter for connecting the regulator with an external terminal. The regulator holding unit is provided with a containing portion in which at least the whole periphery of an opening is surrounded by a wall member; the circuit unit is inserted into the containing portion through the opening; the heat sink is held by the containing portion in such a way that the peripheral portion thereof is adhered to the wall member that surrounds the whole periphery of the opening, and closes the opening; and the containing portion is provided with a resin filled in the vicinity of the contained circuit unit.

Advantages of the Invention

In an in-vehicle AC generator according to the present invention, a regulator holding unit is provided with a containing portion in which at least the whole periphery of an opening is surrounded by a wall member; a circuit unit of the regulator is inserted into the containing portion through the opening; the heat sink for the regulator is held by the containing portion in such a way that the peripheral portion thereof is adhered to the wall member that surrounds the whole periphery of the opening, and closes the opening; and the containing portion is provided with a resin filled in the vicinity of the contained circuit unit. As a result, the heat sink is robustly adhered to the wall member, whereby the regulator is robustly held by the regulator holding unit. Moreover, because the resin filled in the containing portion is not totally exposed to the outside, the deterioration in the resin can be reduced.

BEST MODE FOR CARRYING OUT THE INVENTION

Embodiment 1

Figure 1:
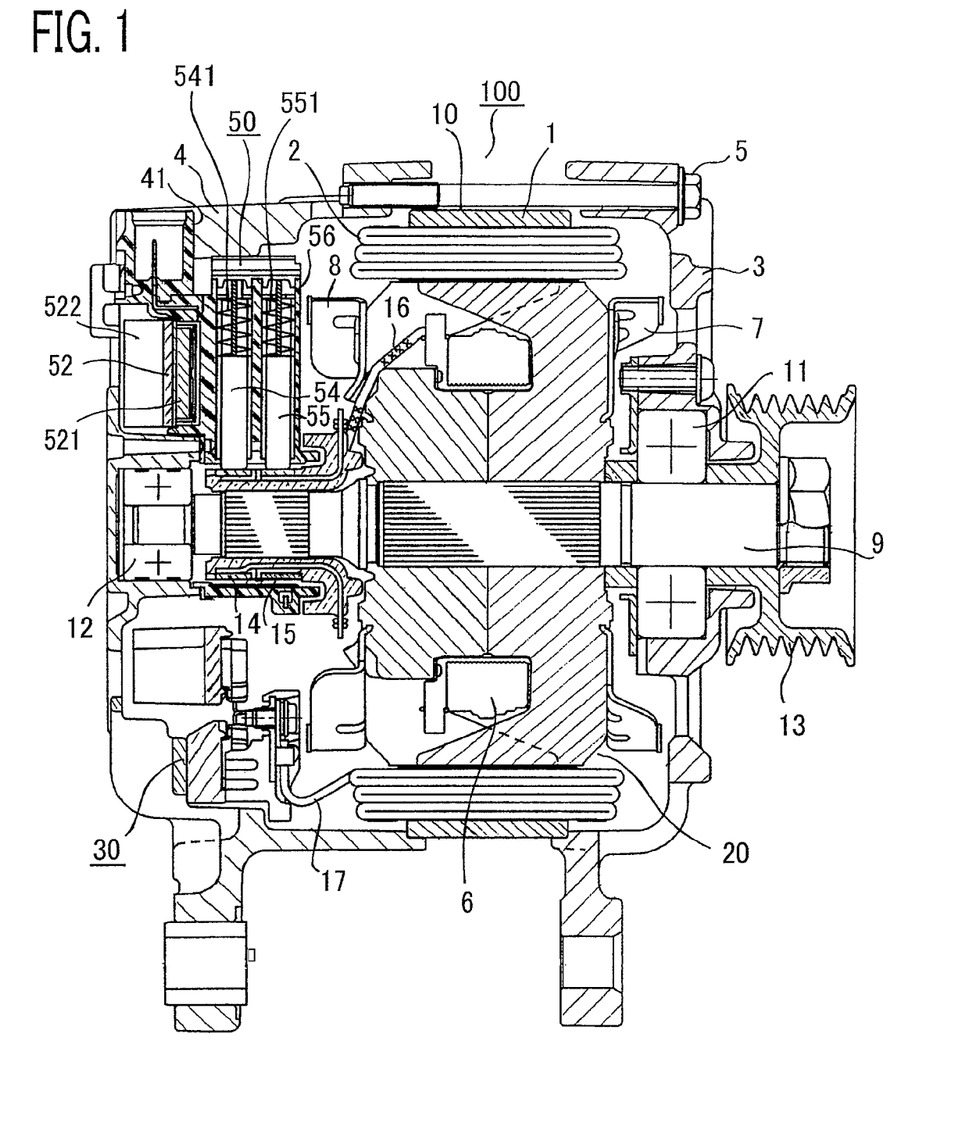
FIG. 1 is a cross-sectional view of an in-vehicle AC generator according to Embodiment 1 of the present invention.
Figure 2:
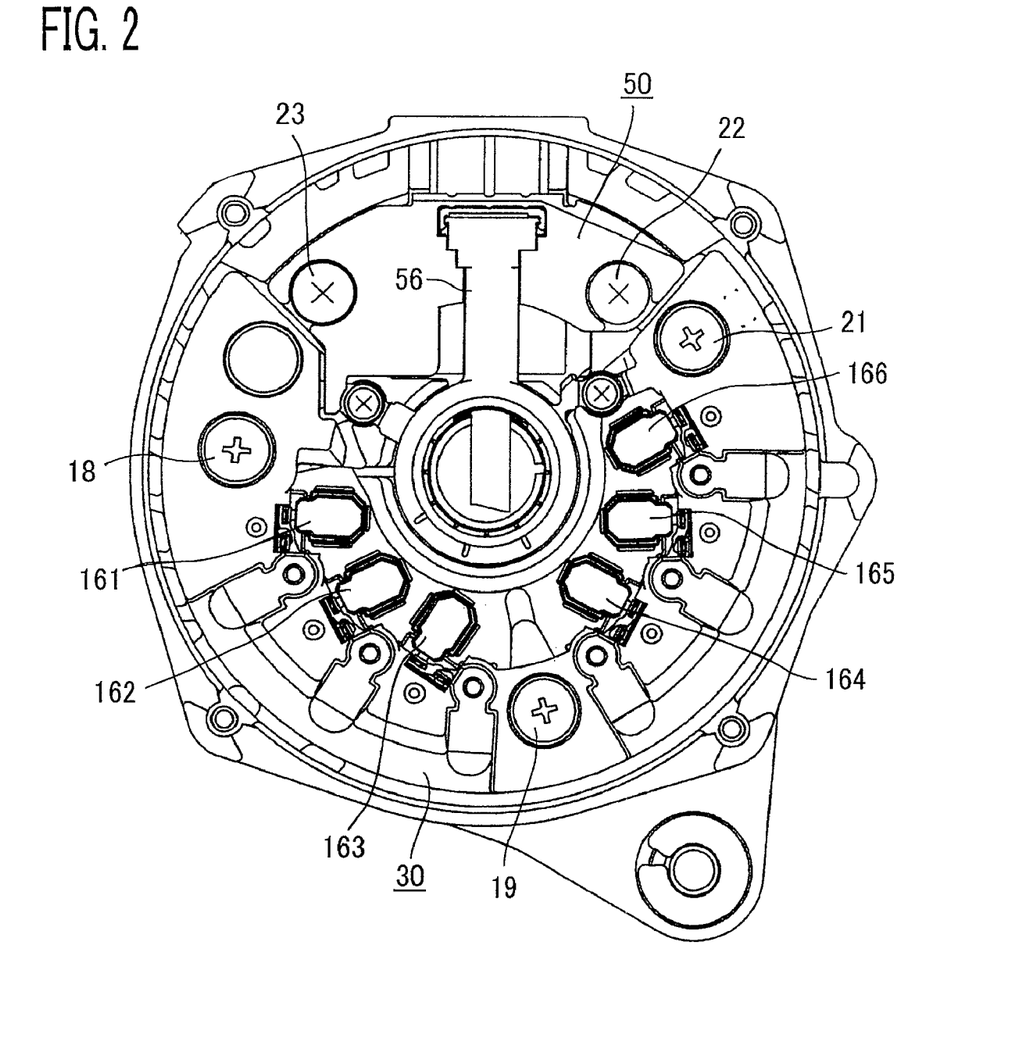
FIG. 2 is a side view of an in-vehicle AC generator according to Embodiment 1 of the present invention, as viewed from the rear bracket side.

FIG. 1 is a cross-sectional view of an in-vehicle AC generator according to Embodiment 1 of the present invention; FIG. 2 is a side view of the in-vehicle AC generator as viewed from the rear bracket side.

In FIGS. 1 and 2, an in-vehicle AC generator 100 is provided with a stator 10 configured with a ring-shaped stator iron core 1 and a stator winding 2. The stator 10 is disposed between a front bracket 3 and a rear bracket 4. The front bracket 3 and the rear bracket 4 are fastened with a plurality of bolts 5 in such a way as to approach each other, thereby flanking the stator 10 disposed between them.

A claw-pole rotor 20 is disposed in a space inside the stator iron core 1 and is provided with a magnetic-field winding 6. Cooling fans 7 and 8 are fixed at the respective axis-direction ends of the rotor 20. The rotor shaft 9 is pressed into the center through-hole in the rotor 20, and the both end portions thereof are pivotably supported by the front bracket 3 and the rear bracket 4 through bearings 11 and 12, respectively. A pulley 13 is fixed on the end portion, at the front bracket side, of the rotor shaft 9, and is coupled with an internal-combustion engine (unillustrated) by the intermediary of a belt (unillustrated).

A pair of slip rings 14 and 15 is fixed at the rear bracket side of the rotor shaft 9 and is connected with the magnetic-field winding 6 of the rotor 20 by the intermediary of a magnetic-field lead wire 16. As well illustrated in FIG. 2, a rectifier assembly 30 is formed in a C shape and holds six positive-polarity diodes 161, 162, 163, 164, 165, and 166 and unillustrated six negative-polarity diodes that rectify an AC voltage induced across the stator winding 2. These positive-polarity diodes 161, 162, 163, 164, 165, and 166 and negative-polarity diodes configure two set of three-phase bridge rectification circuits; the input terminals of the three-phase bridge rectification circuits are connected with the three-phase output terminal of the stator winding 2 by the intermediary of a stator lead wire 17; the respective output terminals of the three-phase bridge rectification circuits are pulled out from the in-vehicle AC generator 100 and connected with the positive and negative terminals of a vehicle battery (unillustrated). The rectifier assembly 30 is disposed in such a way as to surround the rotor shaft 9 and is fixed to the rear bracket 4 with screws 18, 19, and 21.

A regulator 52 is provided with a circuit unit 521 having a circuit that controls a current that flows in the magnetic-field winding 6 and adjusts an AC voltage induced across the stator winding 2; and a heat sink 522 that radiates heat generated in the circuit unit 521. The circuit unit 521 is provided with a hybrid IC mounted on a circuit board inside a resin mold that is formed in a rectangular shape. One side of the heat sink 522 is adhered to a surface 5211 of the circuit unit 521, and the other side thereof is provided with a great number of tabular radiating fins 523. The regulator 52 is held by a regulator holding unit 53 of the regulator assembly 50 described later.

A pair of brushes 54 and 55 makes contact with the pair of slip rings 14 and 15 provided at the rear bracket side of the rotor shaft 9 and supplies a magnetic-field current to the magnetic-field winding 6 by way of the magnetic-field lead wire 16. The pair of brushes 54 and 55 is slidably held by the brush holding unit 56 provided in the regulator assembly 50 described later. As well illustrated in FIG. 2, the regulator assembly 50 is disposed at a space where the C shape of the rectifier assembly 30 opens, and is fixed to the rear bracket 4 with screws 22 and 23.

Next, the regulator assembly 50 that characterizes the present invention will be described. FIGS. 3 to 10 each illustrate the regulator assembly 50. In FIGS. 3 to 10, the regulator assembly 50 is provided with a ring-shaped rotor shaft penetration portion 51 through which the rotor shaft 9 penetrates, the regulator holding unit 53 that holds the regulator 52, the brush holding unit 56 that slidably holds the pair of brushes 54 and 55, and a connecter holding unit 57 that holds a connecter 58 for connecting the regulator 52 with the external terminal. The rotor shaft penetration portion 51, the regulator holding unit 53, the brush holding unit 56, and the connecter holding unit 57 are each formed of an insulator and are integrally fixed.

In the regulator assembly 50, mounting holes 501 and 502 are provided at the respective transverse sides of the regulator holding unit 53; the regulator assembly 50 is fixed to the rear bracket 4 with screws 22 and 23 that penetrate the mounting holes 501 and 502 and are screwed into the rear bracket 4. The regulator assembly 50 is fixed to the rear bracket 4 at both sides of the regulator holding unit 53 and at a space proximal from the rotor shaft; therefore, the excitation force exerted on the heat sink and the circuit unit 521 of the regulator 52 can be suppressed to a minimum quantity.

The regulator holding unit 53 is provided with a rectangular containing portion 532 whose four peripheral sides are formed of a wall member 531 and an opening 533 that is opened in the rotor-shaft center axis direction, i.e., in the direction that is perpendicular to the center axis X of the rotor shaft penetration portion 51. The whole periphery of the opening 533 is surrounded by the wall member 531. The circuit unit 521 of the regulator 52 is inserted into and contained in the containing portion 532 of the regulator holding unit 53, through the opening 533. The whole peripheral sides of the heat sink 522, formed in a rectangular shape, of the regulator 52, i.e., four sides of a rectangular peripheral portion 5211 are adhered by the intermediary of an adhesive to the inside of the wall member 531 that forms the end portions of four sides of the containing portion 532, thereby closing the opening 533 of the containing portion 532. The circuit unit 521, which is contained in the containing portion 532, of the regulator 52 is disposed in such a way that the surface 5211 of the circuit board to which the heat sink 522 is adhered is perpendicular to the center axis X of the rotor shaft penetration portion 51. The regulator including the circuit unit 521 and the heat sink 522 adhered to the circuit unit 521 is mounted in the regulator holding unit from a side, of the regulator assembly 50, which is distal from the rotor 20.

In Embodiment 1, the longitudinal side and the transverse side of the rectangle of the heat sink 522 for the regulator 52 are set to be longer than the longitudinal side and the transverse side of the circuit unit 521, and only the peripheral portion of the heat sink 522 is adhered to the wall portion 531 with an adhesive; however, it may be allowed that the longitudinal sides and the transverse sides of the heat sink 522 and the circuit unit 521 are set to the same dimensions, and the peripheral portions of both the heat sink 522 and the circuit unit 521 are adhered to the wall portion 531 with an adhesive. In this case, the regulator 52 is more robustly held by the regulator holding unit 53. Moreover, it may be allowed that the dimension of only one of the longitudinal and transverse sides of the heat sink 522 is set to be the same as the dimension of the corresponding side of the circuit unit 521, and the peripheral portions of the sides, of the heat sink 522 and the circuit unit 521, which have the same dimension are adhered to the wall portion 531 with an adhesive. Still moreover, it may be allowed that none of the heat sink 522 and the circuit unit 521 is rectangular, or it may be allowed that only one of the heat sink 522 and the circuit unit 521 is rectangular and the other has a shape other than a rectangle.

The brush holding unit 56 is disposed in such a way as to extend from the side face of the rotor shaft penetration portion 51 in the direction perpendicular to the center axis X and is provided with a pair of through-holes 561 and 562 that slidably hold the brushes 54 and 55. As illustrated in FIG. 1, the pair of brushes 54 and 55 that is held by the brush holding unit 56 are always pressed, inside the through-holes 561 and 562, by the springs 541 and 551, respectively, toward the slip rings 14 and 15 in such a way as to make contact with the surfaces of the slip rings 14 and 15. In the brush holding unit 56, there are provided terminals (unillustrated) connected with the respective brushes 54 and 55; the terminals are soldered with the circuit unit 521 of the regulator 52 at a side, of the regulator assembly 50, which is distal from the rotor 20, by the intermediary of lead pins.

One end portion 571 of the connecter holding unit 57 is fixed to a wall portion 5311 that forms one side of the containing unit 53; the connecter holding unit 57 is disposed in such a way as to extend from the one end portion 571 to the other end portion 572 in the direction perpendicular to the center axis X of the rotor shaft penetration portion 51. The connector 58 held by the connecter holding unit 57 connects the circuit unit 521 of the regulator 52 with an external terminal (unillustrated) that is connected with a vehicle control apparatus (unillustrated). Accordingly, the circuit unit 521 of the regulator 50 receives a control signal from the control apparatus by way of the connecter 58, and controls the magnetic-field current so as to control the AC voltage induced across the stator winding 2.

Figure 3:
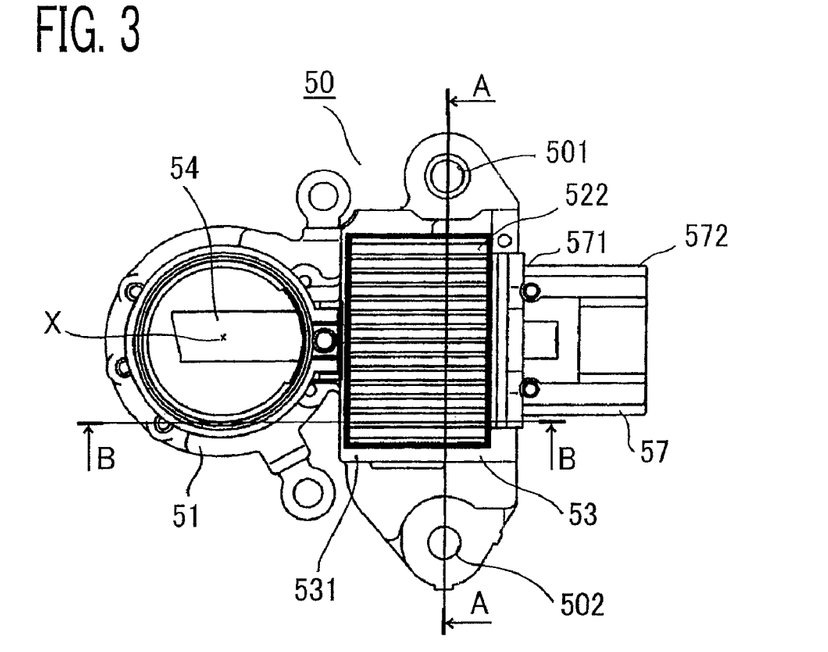
FIG. 3 is a plan view of a regulator assembly of an in-vehicle AC generator according to Embodiment 1 of the present invention.
Figure 4:
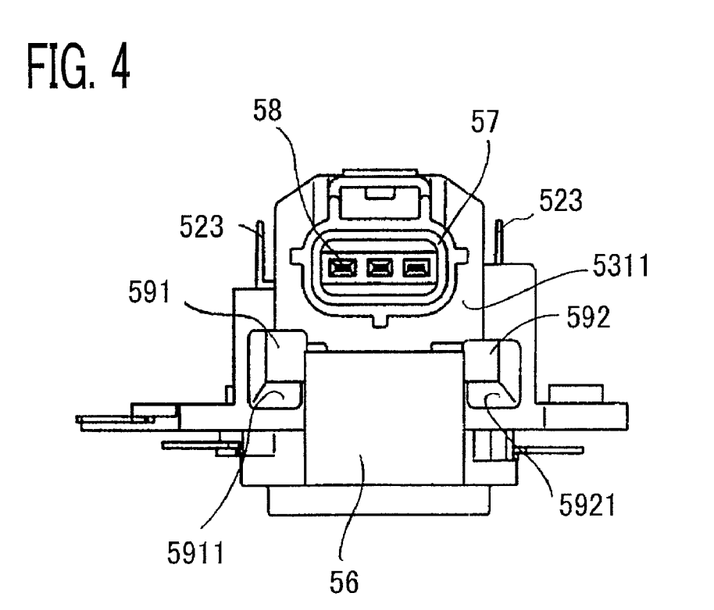
FIG. 4 is a side view of the regulator assembly, as viewed along the arrow D in FIG. 3.
Figure 5:
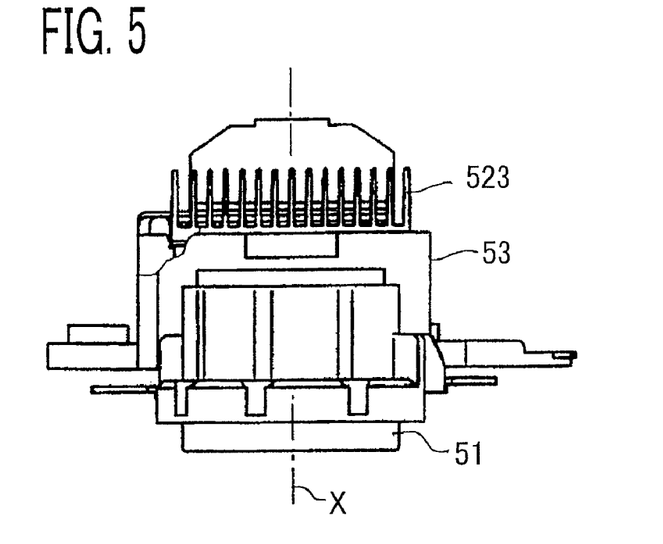
FIG. 5 is a side view of the regulator assembly, as viewed along the arrow E in FIG. 3.
Figure 6:
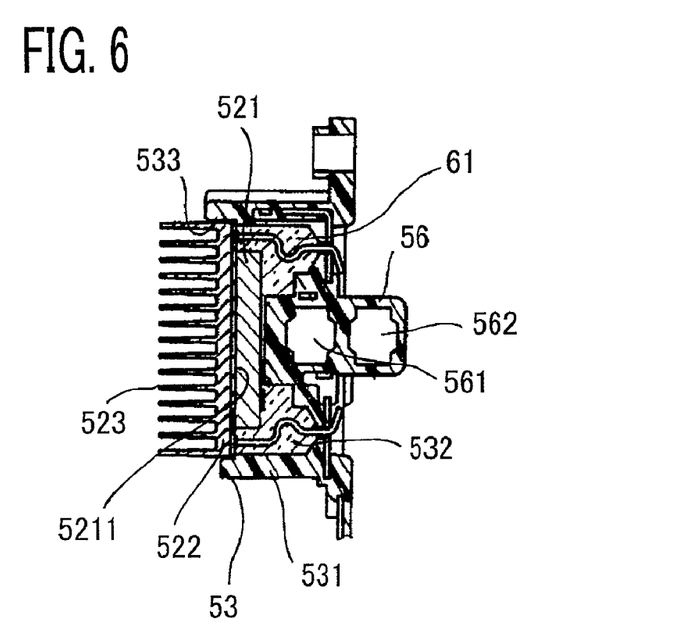
FIG. 6 is a side view of the regulator assembly, as viewed in the direction indicated by the arrows along the A-A line in FIG. 3.
Figure 7:
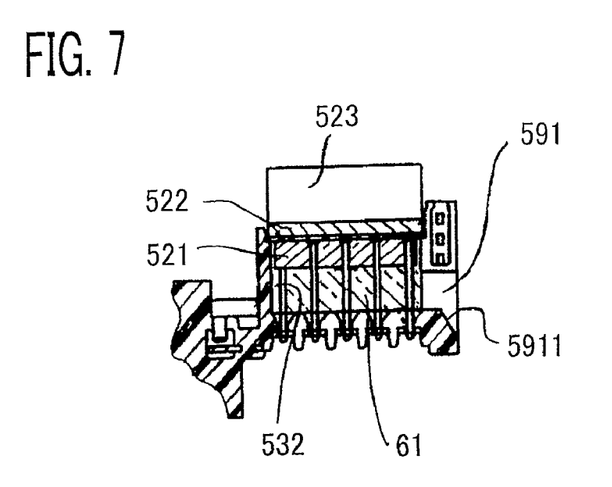
FIG. 7 is a side view of the regulator assembly, as viewed in the direction indicated by the arrows along the B-B line in FIG. 3.
Figure 8:
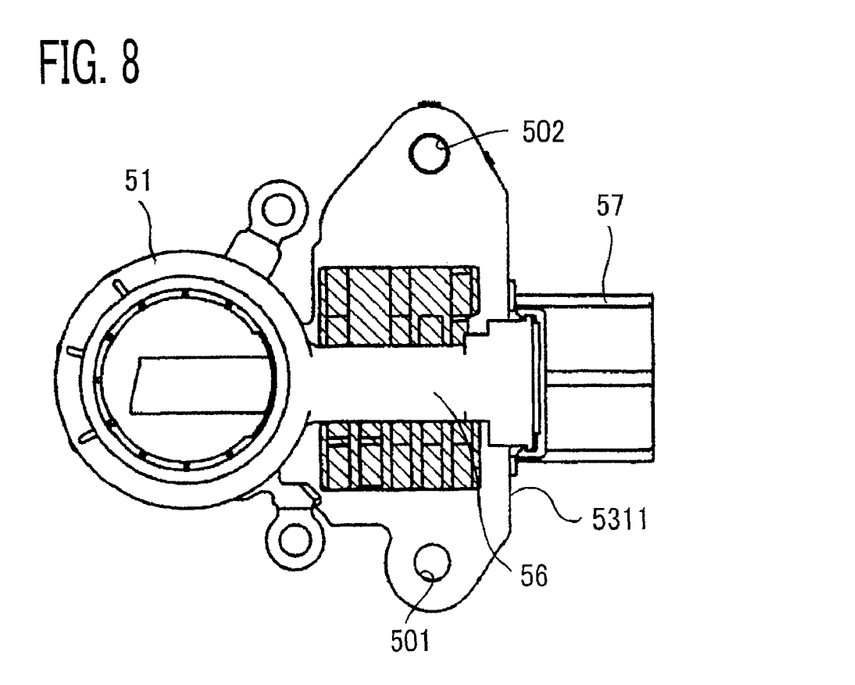
FIG. 8 is a bottom plan view of the regulator assembly according to Embodiment 1 of the present invention.
Figure 9:
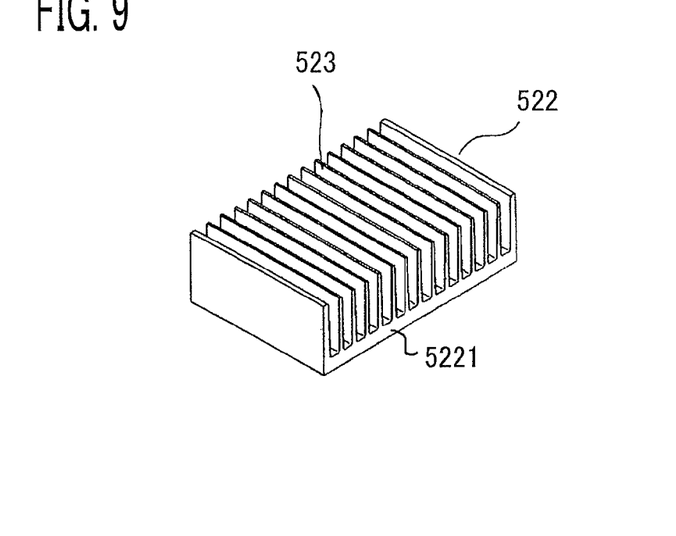
FIG. 9 is a perspective view of a heat sink for a regulator according to Embodiment 1 of the present invention.

As illustrated in FIGS. 3 and 4, a pair of resin filling holes 591 and 592 is provided in the wall portion 5311 of the containing portion 532 to which the one end portion 571 of the connecter holding unit 57 is fixed. The resin filling holes 591 and 592 are provided with taper surfaces 5911 and 65921, respectively, for gradually reducing the cross-sectional areas thereof from the outside to the inside of the containing portion 532.

Figure 10:
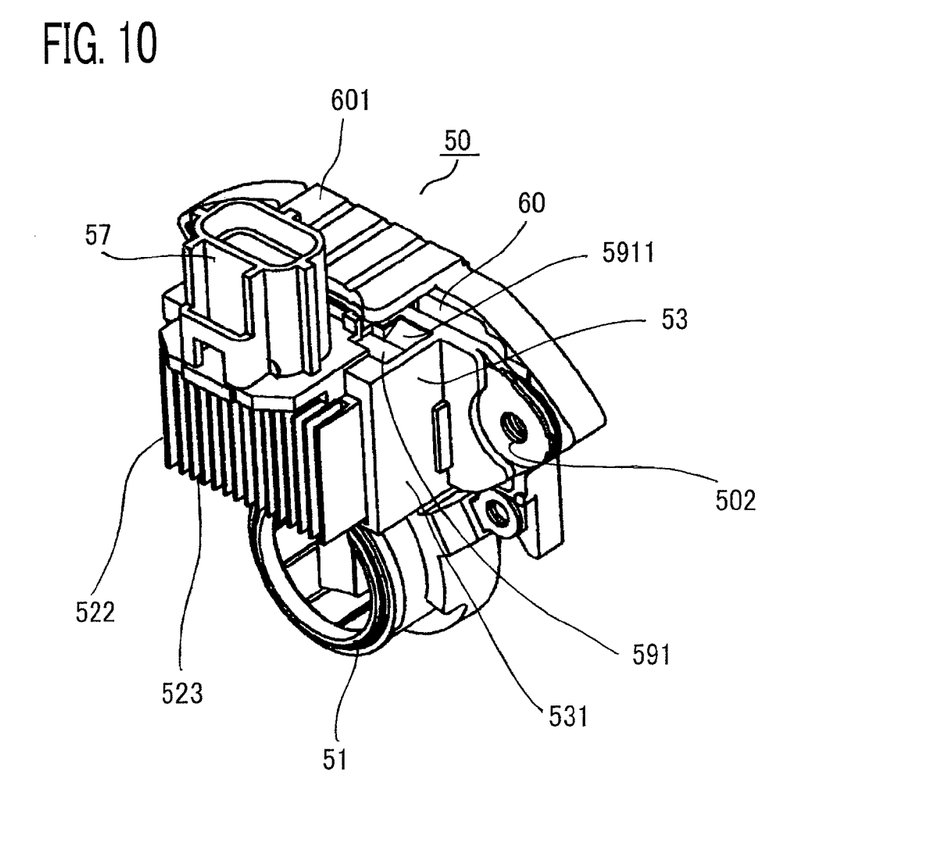
FIG. 10 is a perspective view of the regulator assembly according to Embodiment 1 of the present invention.

As illustrated in FIG. 10, a rear plate 601 is mounted on a side face, of the regulator assembly 50, which is proximal from the rotor 20, i.e., on the side face, of the regulator assembly 50, which is opposite to the side face on which the heat sink 522 of the regulator 52 is exposed to the outside; a noise-preventing capacitor 60 is fixed to the rear plate 601. The noise-preventing capacitor 60 is provided with terminals soldered with wound film-shaped capacitor element that are contained in the rear plate 601 that forms a resin case, and molded in a thin-plate shape with an epoxy resin.

In the regulator assembly 50 configured as described above, the circuit unit 521 of the regulator 52 is inserted into the containing portion 532 of the regulator holding unit 53, through the opening 533, and the four peripheral sides of the heat sink are adhered to the inside of the wall portion 531 with an adhesive, so that the regulator 52 is held by the regulator holding unit 53. Next, through the pair of resin filling holes 591 and 592, a liquid thermosetting resin 61 is filled into the containing portion 532 and hardened with heat. The resin 61 sealed and hardened in the containing portion 532 robustly fixes the circuit unit 521 within the containing portion 532. When the thermosetting resin 61 is filled, because the pair of resin filling holes 591 and 592 is provided, air is readily released from the containing portion 532 even though the thermosetting resin has high viscosity; thus, residual air in the filled thermosetting resin 61 can be eliminated.

The brushes 54 and 55 in a pair are inserted into the through-holes 561 and 562, respectively, in a pair; moreover, as illustrated in FIG. 10, the rear plate 601 is fixed at the side face, of the regulator assembly 50, which is distal from the regulator 52.

As illustrated in FIGS. 1 and 2, the regulator assembly 50 assembled as described above is disposed at a space where the C shape of the rectifier assembly 30 opens, and is fixed to the rear bracket 4 with screws 21 and 22, with the rotor shaft penetration portion 51 penetrated by the rotor shaft 9. In this situation, the other end portion 572 of the connecter holding unit 57 in the regulator assembly 50 makes contact with a face portion 41 of the rear bracket 4 and held by the rear bracket 4. FIG. 2 illustrates a state in which the brushes 54 and 55 have not made contact with the surfaces of the slip rings 14 and 15.

In the in-vehicle AC generator according to Embodiment 1 of the present invention, because all the four peripheral sides of the heat sink 522 are adhered to the wall portion 531 of the containing portion 532 with an adhesive, the regulator 52 can robustly be fixed to the regulator holding unit 53. With regard to the containing portion 532 of the regulator holding unit 53, the four sides are formed of the wall portion 531; therefore, unlike a conventional apparatus, the resin 61 filled in the containing portion 532 is not largely exposed to the outside through one side, of the containing portion 532, which does not have any wall portion. As a result, deterioration in the resin due to change with time can be reduced, whereby the circuit unit 521 can robustly be protected and held.

Because being disposed in a space where the C shape of the rectifier assembly 30 opens, the regulator assembly 50 can compactly be fixed to the rear bracket 4; moreover, because the regulator assembly 50 is robustly fixed to the rear bracket with the screws 22 and 23, the detachment thereof due to a vibration exerted on the circuit unit 521 or the heat sink 522 can be prevented. Still moreover, because the thermosetting resin 61 is filled in the containing portion 532, adhesion between the thermosetting resin 61 and the wall portion 531 makes it possible to more robustly hold the circuit unit 521.

INDUSTRIAL APPLICABILITY

An in-vehicle AC generator according to the present invention is applied mainly to an AC generator mounted in an automobile; however, it can be applied also to an AC generator for a vehicle other than an automobile.

The invention claimed is:
1. An in-vehicle AC generator comprising:
a stator fixed to a bracket;
a stator winding provided on the stator;
a rotor shaft pivotably supported by the bracket;
a rotor that is fixed on the rotor shaft and disposed in a space situated more proximal from the rotor shaft than the stator;
a magnetic-field winding provided on the rotor;
a slip ring that is fixed on the rotor shaft and electrically connected with the magnetic-field winding;
a brush that makes contact with the slip ring and supplies a magnetic-field current to the magnetic-field winding;
a regulator having a circuit unit provided with a circuit for adjusting the value of a voltage generated across the stator winding and a heat sink that is adhered to a surface of the circuit unit and radiates heat generated in the circuit unit; and a regulator assembly having a brush holding unit that slidably holds the brush, a regulator holding unit that holds the regulator, and a connecter holding unit that holds a connecter for connecting the regulator with an external terminal, wherein the regulator holding unit is provided with a containing portion in which at least the whole periphery of an opening is surrounded by a wall member; the circuit unit is inserted into the containing portion through the opening; the heat sink is held by the containing portion in such a way that the peripheral portion thereof is adhered to the wall member that surrounds the whole periphery of the opening, and closes the opening; and the containing portion is provided with a resin filled in the vicinity of the contained circuit unit, and wherein the opening of the containing portion is formed in a rectangular shape, and four sides of the rectangle of the opening are surrounded by the wall member; and the heat sink is formed in a rectangular shape, and four peripheral sides of the rectangle thereof are adhered to the wall member with an adhesive.

2. The in-vehicle AC generator according to claim 1, wherein the heat sink is formed in such a way that the size of the peripheral portion thereof is larger than the size of the peripheral portion of the circuit unit, and the peripheral portion of the heat sink is adhered to the wall member.

3. The in-vehicle AC generator according to claim 1, wherein the heat sink is formed in such a way that at least part of the dimensions of the peripheral portion thereof is the same as the corresponding dimensions of the circuit unit; the heat sink is held by the containing portion in such a way that the peripheral portion thereof is adhered to the wall member that surrounds the whole periphery of the opening, and closes the opening; and the circuit unit is adhered to the wall member at a place where the dimension of the peripheral portion thereof is the same as the dimension of the peripheral portion of the heat sink.

4. The in-vehicle AC generator according to claim 1, wherein the regulator assembly is provided with an approximately ring-shaped rotor shaft penetration portion through which the rotor shaft penetrates; and the brush holding unit is disposed in such a way as to extend from the side face of the rotor shaft penetration portion in a direction perpendicular to a center axis.

5. The in-vehicle AC generator according to claim 1, wherein the connecter holding unit is disposed in such a way that one end portion thereof is fixed to the side portion of the containing portion and in such a way as to extend from the one end portion to the other end portion in a direction perpendicular to the center axis.

6. The in-vehicle AC generator according to claim 5, wherein the other end portion of the connecter holding unit is supported by the bracket.

7. The in-vehicle AC generator according to claim 5, wherein the side portion of the containing portion is provided with a pair of resin filling holes that leads into the containing portion, in the vicinity of a position at which the one end portion of the connecter holding unit is fixed.

8. The in-vehicle AC generator according to claim 7, wherein the resin filling hole is formed in such a way that the area thereof gradually decreases along a direction toward the inside the containing portion.

9. The in-vehicle AC generator according to claim 1, wherein the regulator is mounted in the regulator holding unit from a side, of the regulator assembly, that is distal from the rotor.

10. The in-vehicle AC generator according to claim 1, wherein the regulator assembly is fixed to the bracket at positions that are situated at both end portions of the regulator holding unit and are closer to the rotor shaft than the outer boundary of the regulator holding unit.

\* \* \* \* \*